US010756809B1

(12) United States Patent
Yan

(10) Patent No.: US 10,756,809 B1
(45) Date of Patent: Aug. 25, 2020

(54) EMERGENCY COMMUNICATION SATELLITE TERMINAL MANAGEMENT SYSTEM

(71) Applicant: Beijing Yutian Technology Co.Ltd, Beijing (CN)

(72) Inventor: Libao Yan, Beijing (CN)

(73) Assignee: Beijing Yuritan Technology Co.Ltd, Beijing (CN)

( * ) Notice: Subject to any disclaimer, the term of this patent is extended or adjusted under 35 U.S.C. 154(b) by 0 days.

(21) Appl. No.: 16/687,668

(22) Filed: Nov. 18, 2019

(30) Foreign Application Priority Data

Apr. 17, 2019 (CN) .......................... 2019 1 0306986

(51) Int. Cl.
| | |
|---|---|
| *H04B 7/185* | (2006.01) |
| *H04W 4/90* | (2018.01) |
| *H04W 76/50* | (2018.01) |
| *G06N 20/10* | (2019.01) |
| *H04B 17/40* | (2015.01) |

(52) U.S. Cl.
CPC ......... *H04B 7/18541* (2013.01); *G06N 20/10* (2019.01); *H04B 7/18508* (2013.01); *H04B 7/18517* (2013.01); *H04B 17/40* (2015.01); *H04W 4/90* (2018.02); *H04W 76/50* (2018.02)

(58) Field of Classification Search
CPC ...... H04B 7/18541; H04B 17/40; H04W 4/90
USPC .... 455/428, 404.1, 456.1, 422.1, 414.1, 418
See application file for complete search history.

(56) References Cited

U.S. PATENT DOCUMENTS

| | | | | |
|---|---|---|---|---|
| 5,948,040 | A * | 9/1999 | DeLorme | G01C 21/36 340/990 |
| 10,517,479 | B2 * | 12/2019 | Tran | A61B 5/6891 |
| 2005/0187677 | A1 * | 8/2005 | Walker | G08B 13/1965 701/16 |
| 2017/0247000 | A1 * | 8/2017 | Ricci | B60R 16/037 |

* cited by examiner

*Primary Examiner* — Nghi H Ly
(74) *Attorney, Agent, or Firm* — Getech Law LLC; Jun Ye

(57) ABSTRACT

The present invention discloses an emergency communication satellite terminal management system. In order to improve the information management of emergency satellite phones, the present invention gives full play to the important role of satellite phones in emergency communication, constructs a scientific and reasonable satellite phone management system, and realizes the unified registration, monitoring, management and GIS display for basic information, allocation information, number resource information, operation status and location information of satellite phones and portable satellite stations based on basic requirements of command and dispatch of emergency communication. In case of emergencies, the above management system can provide information resources and decision-making basis for the command department to uniformly dispatch emergency communication resources, so as to improve emergency communication support capability. The main functions of the system include satellite terminal monitoring, satellite terminal management, statistical analysis, GIS display and monitoring, and emergency resource sharing.

6 Claims, 2 Drawing Sheets

EMERGENCY COMMUNICATION SATELLITE TERMINAL MANAGEMENT SYSTEM

TECHNICAL FIELD

Figure 1:
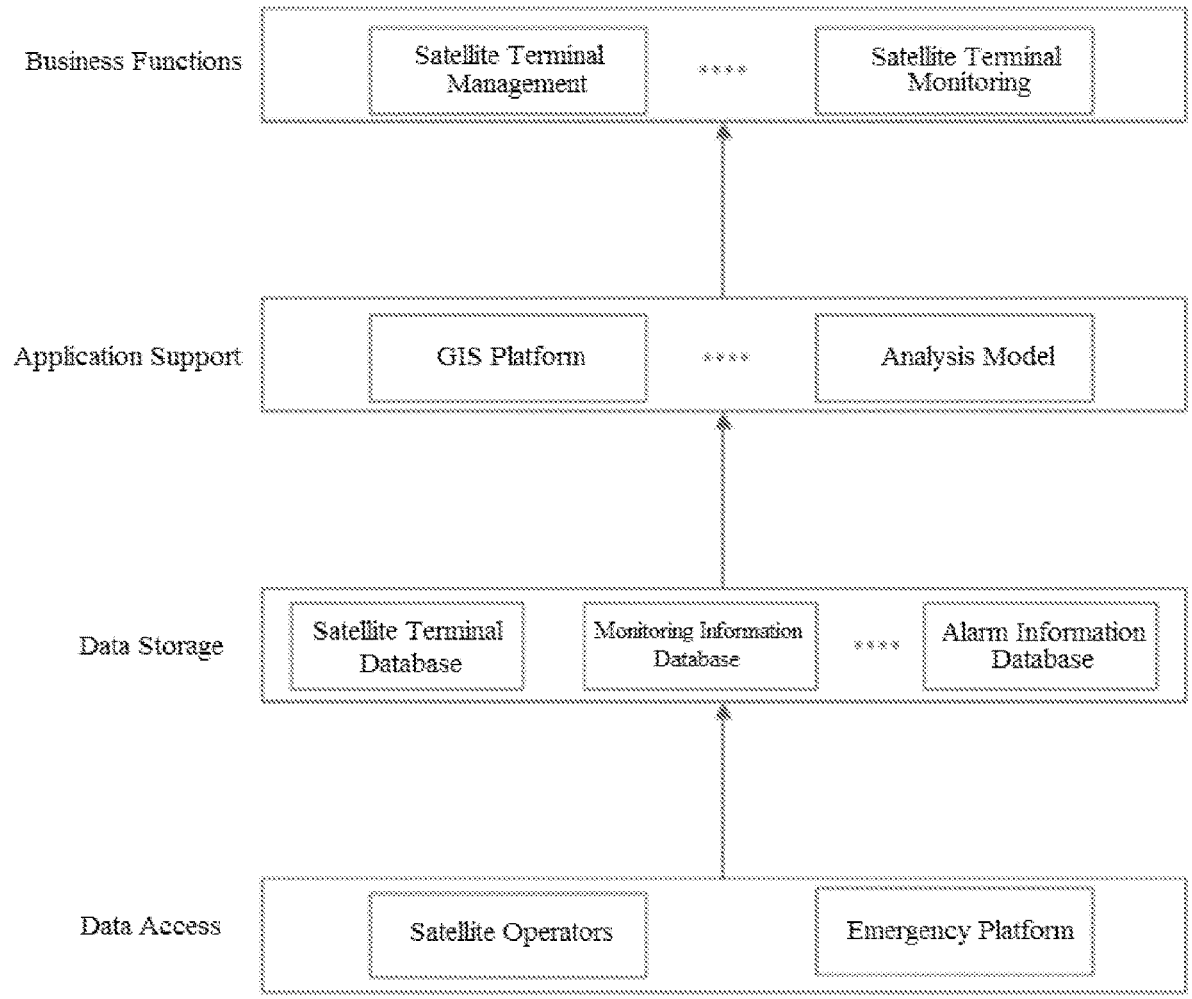

The present invention relates to the field of emergency satellite communication management, in particular to an emergency communication satellite terminal management system.

BACKGROUND ART

In recent years, China has severe public security situation, natural disasters and accidents occur frequently, public health events and social security events happen constantly, and there are still threats to national security. The Chinese government attaches great importance to disposal of emergency events, and especially after the 2008 Wenchuan Earthquake, the State Council has put forward higher requirements for emergency disposal. In order to improve the emergency communication disposal ability for emergency events, the current situation of the communication industry is combed in the paper, and from the perspective of emergency complying with the current industry, an emergency communication satellite terminal management system is established for exploration around the construction of informationized emergency command platform in the communication industry, so as to improve the command and dispatch ability of emergency satellite communication of our country in an all-round way.

During the "Twelfth Five-Year Plan", the country attaches great importance to the development of emergency communication industry. The State Council issues the *Guiding Opinions on Accelerating the Emergency Industry*, and clearly puts forward the focus on the development of emergency communications, emergency command and other emergency products and services, leading the direction of the development of the emergency communication industry and proposing new requirements. The Ministry of Industry and Information Technology attaches great importance to the construction of the national emergency communication system, organizes the preparation and revision of the *National Communication Support Emergency Plan*, successively implements the "Twelfth Five-Year" development plan for the national emergency communication, makes the development of the emergency communication industry as an important task, and makes great efforts to perfect and optimize the established emergency platform to further improve emergency communication disposal capability and emergency communication support capability of emergency events.

As an important part of the national public security emergency system and national defense mobilization system, during the "Twelfth Five-Year Plan", the national emergency communication system has gradually equipped every province, every city and baseline telecom operators with handheld and fixed maritime satellite phones, portable satellite terminals, vehicular satellite communication terminals and other satellite terminal communication equipment, and has preliminarily covered the counties and towns in remote areas of disaster-prone areas. However, at present, the communication industry has not established a set of satellite management system for the unified and effective management of emergency satellite terminals in provinces and cities, which causes the satellite terminals to lack supervision, and causes emergency satellite phones to slowly and ineffectively schedule emergency resources and assign tasks in case of emergencies.

Under the new situation, the General Office of the State Council issues the *Thirteenth Five-Year Plan for the Construction of National Emergency System for Emergency Events*, and puts the improvement of emergency communication support capacity in a more prominent position. When the ground communication network is interrupted in large areas due to emergency events, or when mobile phones, fixed phones and other communications are unable to communicate, satellite phones are particularly important as a safe and reliable means of communication. Satellite phones, as an important means of emergency communication, will be more widely used in emergency agencies, rescue teams and grass-roots emergency organizations. Therefore, the establishment of an "emergency communication satellite terminal management system" can effectively integrate existing satellite communication resources, strengthen monitoring and supervision of various satellite terminals, and effectively enhance the government's emergency communication support capacity and service capacity.

CONTENTS OF THE INVENTION

In view of the lack of effective supervision in emergency satellite terminals in the communication industry, emergency resource scheduling and task assignment cannot be implemented quickly and effectively through emergency satellite phones, which seriously affects the government's emergency communication support capacity and emergency rescue capability. The present invention provides a technology based on GIS, big data and machine learning to realize the whole process management of corresponding satellite terminals, real-time monitoring of emergency satellite terminals, monitoring and early warning, so as to improve the emergency communication support capability, emergency resource scheduling capability and emergency rescue capability, and minimize disaster losses.

The present invention is realized by the following technical scheme: an emergency communication satellite terminal management system includes:

The Whole Process Management of Satellite Terminals: Realize one-stop whole process management of satellite phones and satellite phone number from purchase, warehousing, distribution and return.

Emergency Communication Resource Sharing: Integrate the emergency resources of satellite communication and public communication, and form a GIS map, a space-ground integrated, interconnected and sharing three-dimensional emergency communication service support network, thus enhancing the emergency guarantee capability.

Monitoring and Early Warning of Satellite Terminals: Monitor the working status and position of satellite terminals in real time, make statistics of the number, frequency, duration of fault terminals and communications by phones, and give alarms of anomaly and cross-border prompts according to the set alarm threshold and resident area, so as to effectively enhance the reliability of satellite terminals, and strengthen emergency guarantee capacity and risk control ability.

GIS Monitoring of Satellite Terminals: Monitor the location and status distribution of satellite phones in real time through a GIS map, and conduct track playback and emergency resource query.

Big Data Analysis of Satellite Terminals: Based on the big data technology and machine learning algorithm, different dimensions such as the number, trend, frequency, duration and regional distribution of satellite terminal faults are analyzed comprehensively.

Furthermore, the whole process management of satellite terminals mentioned also includes the purchase management, and ex-warehouse and warehousing management of satellite terminals, satellite phone number management, satellite terminal and number distribution, as well as management of return, loss and damage of satellite terminals.

Furthermore, the emergency communication resources sharing mentioned also includes the storage, sharing and exchange of emergency satellite resources, communication support teams, communication support personnel, communication equipment, emergency command vehicle, network resources and other emergency resources, and adopts unified data interface exchange mode.

Furthermore, the monitoring and early warning system of satellite terminals mentioned cannot only monitor the use status of the satellite phone in real time, but also give alarm prompts according to the preset conditions, such as the phone bill exceeding the limit, the use scope of satellite phones, the number of calls, satellite phone faults and other indicator anomalies, and also includes GIS display module to realize the comprehensive display and query function of the location terminal on the map. The main functions include: peripheral analysis, track playback, resource query, query statistics and real-time positioning.

Furthermore, the big data analysis of satellite terminals mentioned also includes the business modeling based on the big data platform through the logical regression, linear regression, support vector machine and other algorithms, and the comprehensive analysis of the number, trend and frequency of satellite terminal faults.

Furthermore, the satellite phone number management mentioned also includes queries about the call duration of the terminals and the phone bill of satellite phones, including checking the current administrative division, the type of calls, satellite phone number, the number of the other party called, start time, call duration, phone bill and other information.

Compared with the existing technology, the present invention has the following advantages and beneficial effects:

In order to improve the information management of emergency satellite phones, the present invention gives full play to the important role of satellite phones in emergency communication, constructs a scientific and reasonable satellite phone management system, and realizes the unified registration, monitoring, management and GIS display for basic information, allocation information, number resource information, operation status and location information of satellite phones and portable satellite station based on basic requirements of command and dispatch of emergency communication. In case of emergencies, the above management system can provide information resources and decision-making basis for the command department to uniformly dispatch emergency communication resources, so as to improve emergency communication support capability.

ILLUSTRATIONS

In order to make contents of the present invention understood more easily and clearly, the present invention is further described in detail in accordance with specific embodiments of the present invention and figures, where FIG. 1 shows the architecture of an emergency communication satellite terminal management system in an embodiment of the present invention.

Figure 2:
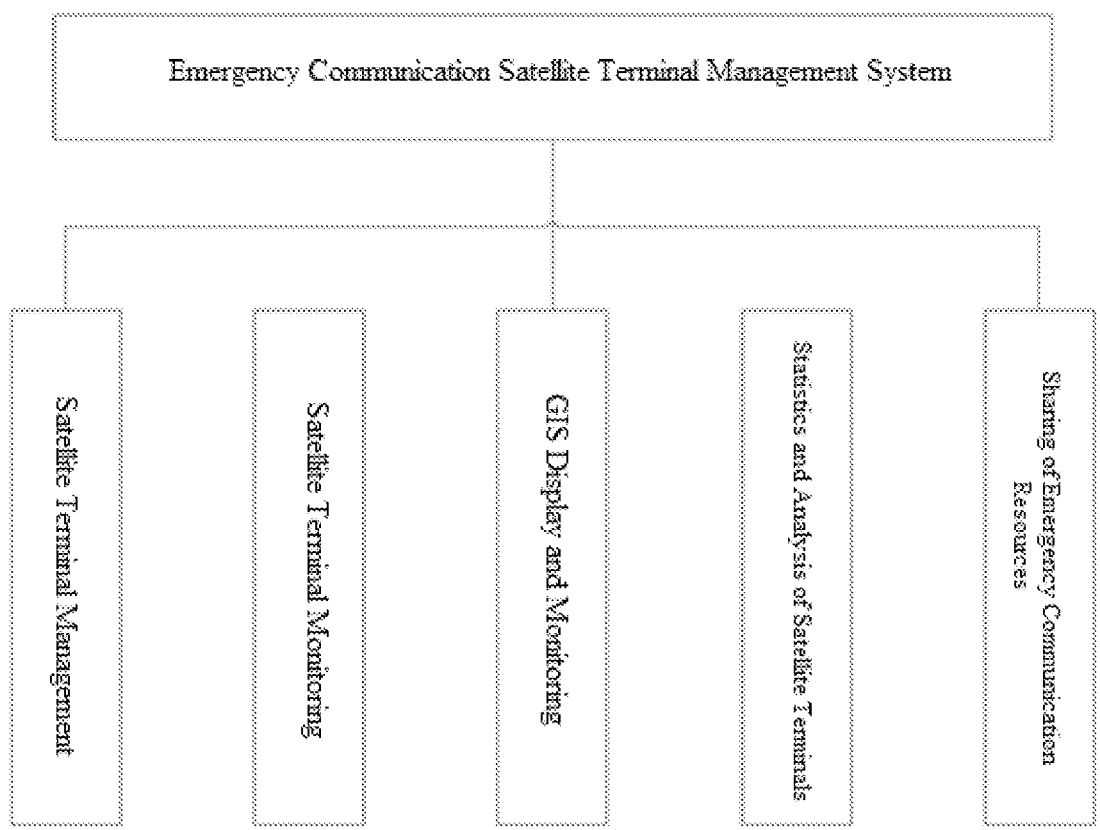

FIG. 2 shows the structure of an emergency communication satellite terminal management system in an embodiment of the present invention.

EMBODIMENTS

The following contents are detailed descriptions for embodiments of the present invention combined with figures. The following embodiments are used to describe the present invention but are not used to limit the scope of the present invention.

Embodiment 1

FIG. 1 shows the architecture of an emergency communication satellite terminal management system provided by the present invention, and the system architecture is divided into data access layer, data storage layer, application support layer and business function layer from bottom to top. The above layers separately provide the corresponding data access and storage services, general supporting component services, basic support platform services to support development and operation, and specific business applications realized by underlying components and services, and show specific business applications to end users.

Business Function Layer: In order to improve the information management of emergency satellite phones, the emergency communication satellite terminal management system gives full play to the important role of satellite phones in emergency communication, constructs a scientific and reasonable satellite phone management system, and realizes the unified registration, monitoring, management and GIS display for basic information, allocation information, number resource information, operation status and location information of satellite phones and portable satellite station based on basic requirements of command and dispatch of emergency communication. In case of emergencies, the above management system can provide information resources and decision-making basis for the command department to uniformly dispatch emergency communication resources. The main functions of emergency communication satellite terminal management system include satellite terminal monitoring, satellite terminal management, statistical analysis, GIS display and monitoring, and emergency resource sharing. The system data are from business information management systems such as position tracking and terminal status monitoring of satellite operators, and connect with the interface with emergency platform.

Application Support Layer: (1) GIS Platform: the GIS display module realizes the comprehensive display and query function of the location terminal on the map. The main functions include: peripheral analysis, track playback, resource query, query statistics, real-time location, etc. (2) Analysis Models: all kinds of analysis models and data resources integration are established. Logical regression, linear regression, support vector machine and other algorithms in machine learning are used for deep digging. The models established include analysis models of satellite terminal faults, event study and determination model, analysis model of satellite terminal resources, monitoring and early warning model, etc.

Data Storage Layer: Data resource layer provides mechanism of data storage, management and resource access, and provides data and resource services for the above layers.

Basic information database, GIS information database, emergency resource database, resource sharing database, emergency satellite terminal database, monitoring information database, and alarm information database are mainly constructed. The structured data is mainly stored in oracle relational database, and unstructured and semi-structured data are stored in Hadoop big data platform, which supports the dynamic expansion of server storage capacity and provides big data analysis for command decision-making and emergency decision-making support. The big data platform adopts Hadoop+Hbase+Spark architecture, supports structured, unstructured and semi-structured data, backs dynamic expansion of file storage, and provides distributed storage of massive data and high-performance distributed computing framework. Data analysis such as data digging analysis and decision-making support is completed.

Data Access Layer: Access to satellite operators, emergency platforms and other external systems, satellite operators regularly or timely on demand input satellite terminal monitoring information, call records and other related data into the information collection interface system. Then, the information after extraction and conversion is input into the big data platform for emergency by the system to analyze and make statistics of storage and data quality, so as to supply users for analysis and decision-making. Data such as emergency resources and emergency basic information are extracted from emergency platform database and related systems.

Embodiment 2

The functional structure diagram of emergency communication satellite terminal management system is shown in FIG. 2, including such parts as satellite terminal monitoring, satellite terminal management, statistical analysis, GIS display and monitoring, and emergency resource sharing. Specific functions are designed as follows:

Satellite Terminal Monitoring: The terminal monitoring subsystem includes the information collection, status and location monitoring, and call record query. Information collection mainly realizes the interface configuration (the part of system management) of satellite operator management system and the statistical function of collected information; the status and position monitoring realizes the query of the working status and position information of the issued terminal; the call record query realizes the query of call records of the location terminal number.

Satellite Terminal Management: The satellite terminal management subsystem includes the terminal management, allocation management, number management and comprehensive query. The terminal management mainly realizes the maintenance of the storage status and warehousing of satellite terminals; the allocation management realizes the query of allocated terminals and issuing of the terminals not issued; the satellite number management mainly realizes the input of terminal number and recording of number distribution; the comprehensive query can realize a general query of basic information and allocation information of satellite terminals.

Statistical Analysis of Satellite Terminals: Statistical query subsystem of satellite terminals includes fault statistics query and terminal distribution statistics. Where (1) Fault Statistics: make statistics of the number, change trend, frequency and duration of faults. (2) Terminal Distribution: the statistics of the number of terminals issued and stored in an administrative division are realized, and the statistical dimensions include administrative divisions and units of use.

GIS Display and Monitoring: GIS display mainly realizes the integrated display and query functions of location terminals on maps, including peripheral analysis, track playback, resource query, query statistics and real-time positioning.

Emergency Communication Resource Sharing: Integrate the emergency resources of satellite communication and public communication, and form a GIS map, a space-ground integrated, interconnected and sharing three-dimensional emergency communication service support network, thus enhancing the emergency guarantee capability. Emergency resources include emergency communication support teams, emergency personnel, emergency vehicles, emergency satellite phones, and infrastructure and so on. Data sharing and exchange can be provided outward through a unified interface.

I claim:

1. An emergency communication satellite terminal management method, comprising:
   realizing one-stop whole process management of satellite phones and satellite phone number from purchase, warehousing, distribution and return;
   integrating the emergency resources of satellite communication and public communication, and form a geographic information system (GIS) map, a space-ground integrated, interconnected and sharing three-dimensional emergency communication service support network, thus enhancing the emergency guarantee capability;
   monitoring the working status and position of satellite terminals in real time, make statistics of the number, frequency, duration of fault terminals and communications by phones, and give alarms of anomaly and cross-border prompts according to the set alarm threshold and resident area, so as to effectively enhance the reliability of satellite terminals, and strengthen emergency guarantee capacity and risk control ability;
   monitoring the location and status distribution of satellite phones in real time through a GIS map, and conduct track playback and emergency resource query; and
   analyzing from the different dimensions such as the number, trend, frequency, duration and regional distribution of faults of satellite terminals based on the big data technology.

2. The emergency communication satellite terminal management method of claim 1, further comprising a purchase management, and ex-warehouse and warehousing management of satellite terminals, satellite phone number management, satellite terminal and number distribution, as well as management of return, loss and damage of satellite terminals.

3. The emergency communication satellite terminal management method of claim 1, wherein the sharing the emergency communication resources further comprises storage, sharing and exchange of emergency satellite resources, communication support teams, communication support personnel, communication equipment, emergency command vehicle, network resources and other emergency resources, and adopts unified data interface exchange mode.

4. The emergency communication satellite terminal management method of claim 1, wherein the monitoring further includes giving alarm prompts according to the preset conditions, such as the phone bill exceeding the limit, the use scope of satellite phones, the number of calls, satellite phone faults and other indicator anomalies, and also includes GIS display module to realize the comprehensive display and query function of the location terminal on the map. The main functions include: peripheral analysis, track playback, resource query, query statistics and real-time positioning.

5. The emergency communication satellite terminal management method in claim 1, further comprising business modeling based on the big data platform through the logical regression, linear regression, support vector machine and other algorithms, and the comprehensive analysis of the number, trend and frequency of satellite terminal faults.

6. The emergency communication satellite terminal management method of claim 2, wherein the satellite phone number management includes queries about the call duration and the phone bill of the terminals of satellite phones, including checking the current administrative division, the type of calls, satellite phone number, the number of the other party called, start time, call duration, phone bill and other information.

* * * * *

UNITED STATES PATENT AND TRADEMARK OFFICE
CERTIFICATE OF CORRECTION

PATENT NO. : 10,756,809 B1  
APPLICATION NO. : 16/687668  
DATED : August 25, 2020  
INVENTOR(S) : Libao Yan Page 1 of 1

It is certified that error appears in the above-identified patent and that said Letters Patent is hereby corrected as shown below:

On the Title Page

Item (73) Assignee:
The word "Yuritan" is incorrect. The correct word is as follows:
"Yutian".

Item (30) Foreign Application Priority Data:
The application number "2019 1 0306986" is incorrect. The correct application number is as follows:
"201910306986.8".

Signed and Sealed this  
Thirtieth Day of November, 2021

Drew Hirshfeld  
*Performing the Functions and Duties of the*  
*Under Secretary of Commerce for Intellectual Property and*  
*Director of the United States Patent and Trademark Office*